E. W. HADLEY & H. W. GOSSETT.
CONCRETE POST MOLD.
APPLICATION FILED APR. 14, 1913.
1,130,507.
Patented Mar. 2, 1915.
2 SHEETS—SHEET 1.
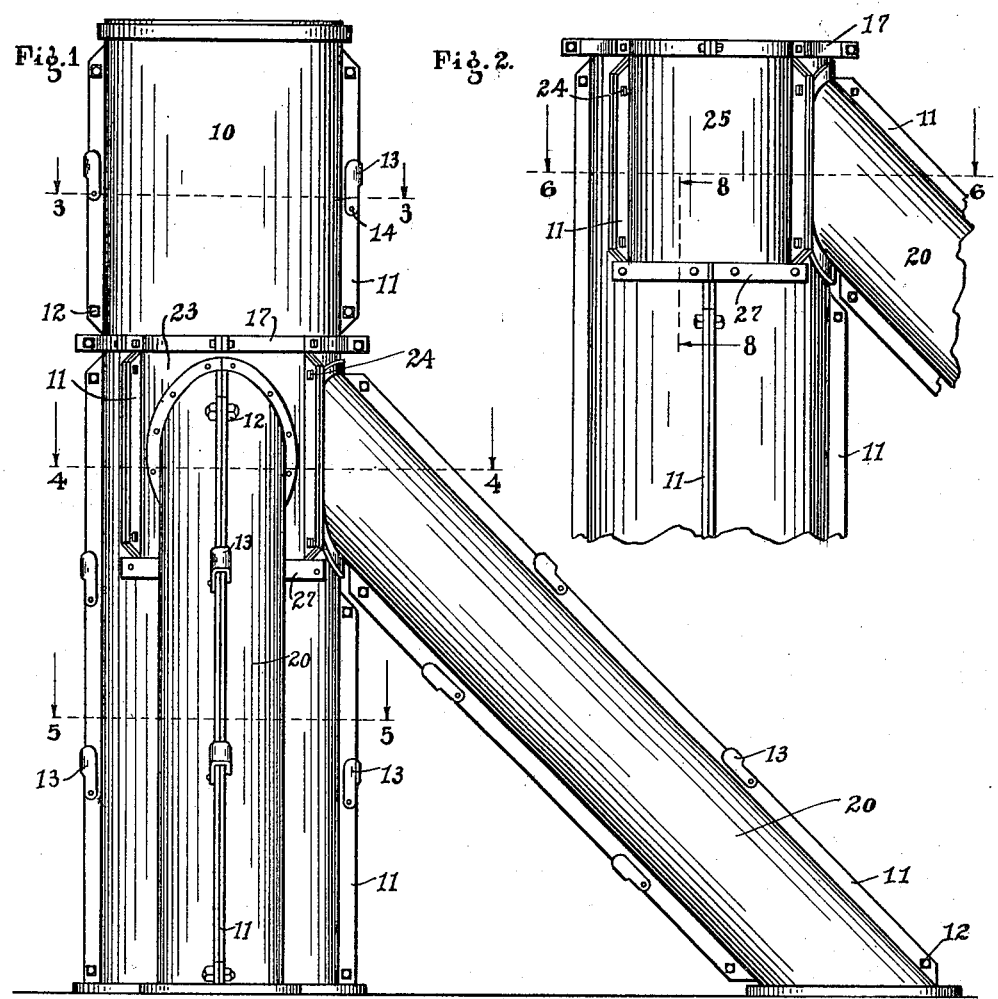
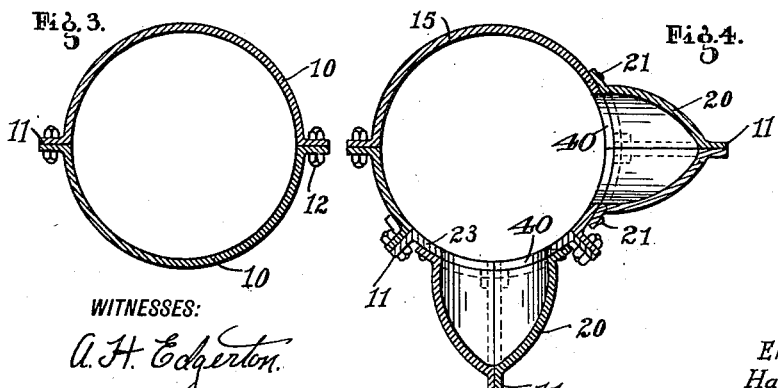
WITNESSES:
A. H. Edgerton
J. A. Boyle
INVENTORS
Enos W. Hadley +
Harold W. Gossett.
BY
V. H. Lockwood
ATTORNEY E. W. HADLEY & H. W. GOSSETT.
CONCRETE POST MOLD.
APPLICATION FILED APR. 14, 1913.
1,130,507.
Patented Mar. 2, 1915.
2 SHEETS—SHEET 2.
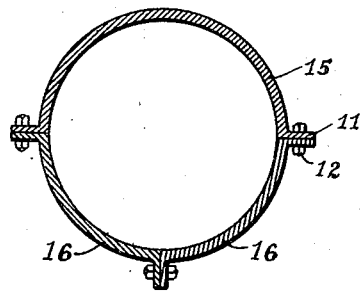
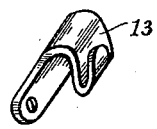
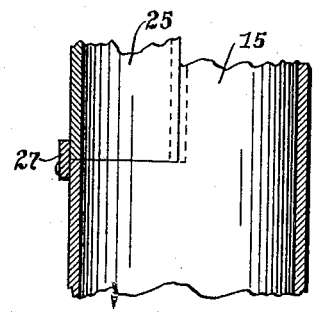
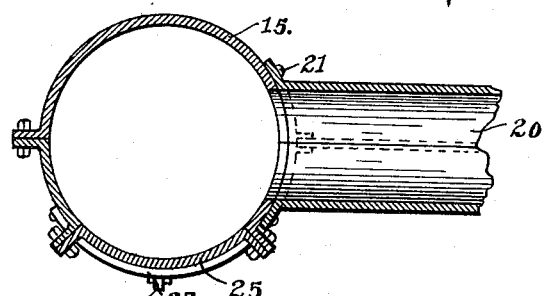
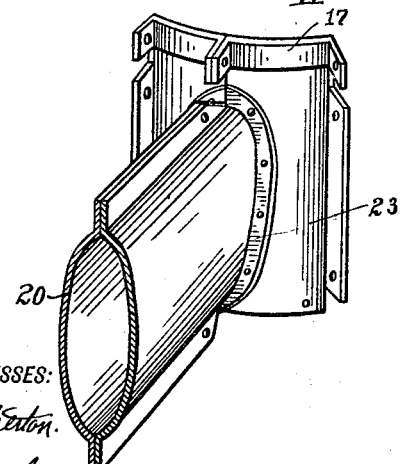
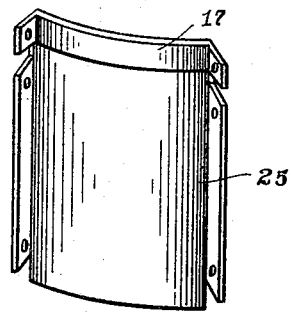
WITNESSES:
A. H. Edgerton
J. A. Boyle
INVENTORS
Enos W. Hadley +
Harold W. Gossett
BY
V. H. Lockwood
ATTORNEY

UNITED STATES PATENT OFFICE.

ENOS W. HADLEY AND HAROLD W. GOSSETT, OF DANVILLE, INDIANA.

CONCRETE-POST MOLD.

1,130,507. Specification of Letters Patent. Patented Mar. 2, 1915.

Application filed April 14, 1913. Serial No. 760,964.

*To all whom it may concern:*

Be it known that we, ENOS W. HADLEY and HAROLD W. GOSSETT, citizens of the United States, and residents of Danville, county of Hendricks, and State of Indiana, have invented a certain new and useful Concrete-Post Mold; and we do hereby declare that the following is a full, clear, and exact description thereof, reference being had to the accompanying drawings, in which like letters refer to like parts.

The object of this invention is to provide molds for concrete posts, suitable for fencing, gates and the like, and which have one or more braces, the mold being arranged so that it can be set up for any desired post in advance so as to provide for the molding of both the post proper, of the brace or braces, and be convenient in manipulation, both during and after the molding of the post.

One feature of the invention consists in providing a main post mold with one or more brace molds extending therefrom and forming a portion of the main mold which extends above the brace mold removably, whereby the brace mold will be accessible for the introduction of reinforcing and also filling the same with concrete.

Another feature of the invention consists in making the main post mold so that it can be taken down after the post and brace have been molded, without interfering with the brace. This is accomplished by making the main mold of more than two sections vertically, at least below the position of the brace mold. This need arises only when there is a plurality of brace molds less than 180 degrees apart. For one brace mold or two brace molds 180 degrees apart, the main mold may be divided into two half sections separated centrally of the brace mold. But when a second brace mold is added at an angle to another brace mold, the main mold below said additional brace mold is divided again vertically and centrally of said additional brace mold.

Another feature of the invention consists in providing the main mold with openings adapted to be closed by removable doors or plates, and attached to the brace mold are plates adapted to be secured in said opening, when desired.

The foregoing and other features of this invention will be understood from the accompanying drawings and the following description and claim.

In the drawings Figure 1 is a side elevation of a mold suitable for forming a corner fence post with two braces at right angles to each other. Fig. 2 shows the central part of what appears in Fig. 1 with one brace mold removed and the remaining parts broken away or omitted. Fig. 3 is a transverse section on the line 3—3 of Fig. 1. Fig. 4 is a similar section on the line 4—4 of Fig. 1. Fig. 5 is a similar section on the line 5—5 of Fig. 1. Fig. 6 is a section similar to that shown in Fig. 4 with one of the braces omitted, and the opening therefor closed, and being on the line 6—6 of Fig. 2. Fig. 7 is a perspective view of one of the mold latches. Fig. 8 is a section through part of the mold on the line 8—8 of Fig. 2. Fig. 9 is a perspective view of the upper end of a removable brace mold. Fig. 10 is a perspective view of the removable plate for closing the brace mold opening.

This invention contemplates preferably the formation of a mold of sheet metal with the edges bent to form radially and outwardly extending flanges. The upper part of the main post mold is formed of two semicircular plates 10 with said flanges 11 secured together by bolts 12, forming a tube with vertical reinforcing ribs between the ends of the tube. Said ribs or flanges are on each side further held together and secured by clasps 13 pivoted between the said ribs or flanges at 14, and the free end of said clasps grooved to fit astride the flanges 11 and hold them tight together. The upper end of the main mold is removable and is lifted off until the lower two-thirds of the mold has been filled with concrete.

The lower section of the main mold is formed for most of its length, as shown in Fig. 5, of a semicircular plate 15 and two plates 16 having a width of 90 degrees each, and each of these plates is provided along each of its edges with a rib or flange 11, and these flanges are secured together by the bolts 12. There are also clasps 13 secured to the flanges 11 of the mold at intervals. On the upper end of the lower part of the mold there are reinforcing bars 17 secured together and arranged in circular form so as to receive the lower end of the upper mold section and hold it in place while the latter is being filled with concrete.

There is a brace mold for the brace consisting of two halves 20 fastened together with bolts 12 through the flanges 11 and having also the clasps 13. The ends of these brace molds are beveled so that one end will lie flat on the ground while the other will embrace a portion of the outer surface of the main mold near the top of the lower section thereof. One of these brace molds is preferably secured by bolts 21 to the main post mold, so that the central separating line between the halves of the brace mold will be in alinement with the lines of separation of the plates of the main mold. Therefore after the post is formed of concrete, both the brace and main mold may be removed by separating one side or half thereof. As shown in Fig. 4, an opening 40 is provided in the main mold for it to communicate with the brace mold 20. Said opening is formed by cutting half of the opening out of each of the adjacent main mold sections.

In order to provide another brace mold at a right angle to the first mentioned brace mold, said additional brace mold is secured to a plate 23 which is secured in an opening in the upper part of the lower sections of the main mold by bolts 24 through flanges 11 on said plate 23 and on the main mold. Said plate 23 is formed of two halves joined at a central vertical line and having also an opening 40 therein to communicate with the brace mold similar to the opening 40 above described. This additional brace mold is mounted centrally over the line of separation between the two sections 16 of the main mold. Therefore, after a post is cast with two braces, the molds can be removed, because one half of the lower part of the main mold is formed in two sections, the line of union between the main sections being in alinement with the lines of union between the halves of the brace molds.

When the second brace mold is not used it is taken out and in the opening in the main mold caused thereby, the plate 25 is secured, it having flanges corresponding with the plate 23.

In operation, when it is desired to make an end line post or a gate post, only one brace mold is used, and therefore the opening for the other brace mold is closed by plate 25. The upper section of the main mold is removed and then the cement is introduced into the main and brace mold and also reinforcing is introduced therein, and because the upper end of the lower section of the main mold is at the upper end of the brace mold, it is convenient to introduce reinforcement into the brace mold, and it is also convenient to introduce concrete into the same. When the brace mold and the lower portion of the main mold are filled with concrete, then the upper portion of the main mold is put in place and the post is finished. After the post is set, the halves of the main mold and brace mold are separated and removed and they are put together again before the next post is molded. If a corner post is desired to be built, the plate 25 is taken out of the main mold and the other brace mold and plate 23 are secured in position and the operation above described is repeated, excepting that there will be two brace molds to fill with reinforcing and concrete. When the corner post is set, it is necessary then not only to separate the halves of the main mold and the first mentioned brace mold, as specified in the preceding paragraph, but it is also necessary to separate the other brace mold and the side of the lower part of the main mold with which it is connected into two separate halves, so that they can be removed without injuring the main post or the braces.

There is a strip 27 secured to the lower part of the opening for holding the plates 23 and 25 in place. Its office is the same as that of the strip 17 which holds the lower ends of the upper portion of the main post mold.

The invention is not necessarily limited to the use of sheet metal, although that is the most economical and convenient way of building the molds. Nor is the invention limited to the details herein set forth.

The invention is:

A main post mold divisible into a plurality of vertical sections, a brace mold formed of two longitudinal sections secured to said main mold, the main mold and brace mold being separable in substantially the same plane, an opening formed in the side of the main mold and an additional brace mold secured to a plate removably secured in said opening, said main mold being divided into vertical sections united in the same plane as the union of said additional brace mold sections.

In witness whereof, we have hereunto affixed our signatures in the presence of the witnesses herein named.

ENOS W. HADLEY.
HAROLD W. GOSSETT.

Witnesses:
JULIA H. WELLS,
O. M. McLAUGHLIN.

Copies of this patent may be obtained for five cents each, by addressing the "Commissioner of Patents, Washington, D. C."